US00RE37143E

(19) United States
(12) Reissued Patent
Liu

(10) Patent Number: US RE37,143 E
(45) Date of Reissued Patent: Apr. 24, 2001

(54) SLAT ANGLE ADJUSTING DEVICE FOR A VENETIAN BLIND

(76) Inventor: Tai-ping Liu, No. 15, Alley 8, Lane 3, Kuochi St., Lungching Hsien, Taichung Hsien (TW)

(21) Appl. No.: 09/328,776

(22) Filed: Jun. 9, 1999

Related U.S. Patent Documents

Reissue of:
(64) Patent No.: 5,636,677
Issued: Jun. 10, 1997
Appl. No.: 08/690,798
Filed: Aug. 1, 1996

(51) Int. Cl.[7] ..... E06B 9/38
(52) U.S. Cl. ..... 160/177 R
(58) Field of Search ..... 160/166.1 R, 168.1 R, 160/170 R, 171 R, 172 R, 173 R, 176.1 R, 177 R, 178.1 R, 115, 107

(56) References Cited

U.S. PATENT DOCUMENTS

| | | | |
|---|---|---|---|
| 4,245,687 | 1/1981 | Vacchiarelli | 160/177 |
| 4,406,319 | 9/1983 | McNiel et al. | 160/177 |
| 4,522,245 | 6/1985 | Anderson | 160/177 |
| 4,541,468 | 9/1985 | Anderson | 160/177 |
| 4,676,292 | 6/1987 | Valle et al. | 160/176 R |
| 4,850,416 | 7/1989 | Evers | 160/188 |
| 5,396,945 | 3/1995 | Meyer | 160/177 |

*Primary Examiner*—David M. Purol
(74) *Attorney, Agent, or Firm*—Michaelson & Wallace; Peter L. Michaelson

(57) ABSTRACT

A slat angle adjusting device for a Venetian blind includes a first casing and a second casing coupled with each other. A pinion is rotatably mounted between the first and second casings. A worm is rotatably mounted between the first and second casings and meshes with the pinion. A driven gear is fixedly mounted on one end of the worm. A drive gear is rotatably mounted between the first and second casings and meshes with the driven gear. A drive axle is formed on one end of the drive gear and extends outward of the first and second casings. A bracket includes a fist end portion engaged with the first and second casings, and a second end portion having two side walls extending upwardly therefrom. A roller is fixedly mounted on the drive axle and is rotatably received between the two side walls of the bracket.

5 Claims, 5 Drawing Sheets

SLAT ANGLE ADJUSTING DEVICE FOR A VENETIAN BLIND

Matter enclosed in heavy brackets [ ] appears in the original patent but forms no part of this reissue specification; matter printed in italics indicates the additions made by reissue.

FIELD OF THE INVENTION

The present invention relates to an angle adjusting device, and more particularly to a slat angle adjusting device for a Venetian blind.

BACKGROUND OF THE INVENTION

A conventional slat angle adjusting device for a Venetian blind is shown in FIG. 5, however, there still remain shortcomings therein. There will be a complete illustration in the detailed description of the preferred embodiments, concerning the conventional adjusting device.

The present invention has arisen to mitigate and/or obviate the disadvantage of the conventional device.

SUMMARY OF THE INVENTION

In accordance with one aspect of the present invention, there is provided a slat angle adjusting device for a Venetian blind and comprising a first casing and a second casing coupled with each other.

A pinion is rotatably mounted between the first and second casings. A worm is rotatably mounted between the first and second casings and meshes with the pinion. A driven gear is fixedly mounted on one end of the worm. A drive gear is rotatably mounted between the first and second casings and meshes with the driven gear. A drive axle is formed on one end of the drive gear and extends outward of the first and second casings.

A bracket includes a first end portion engaged with the first and second casings, and a second end portion having two side walls extending upwardly therefrom. A roller is fixedly mounted on the drive axle and is rotatably received between the two side walls of the bracket.

Further features of the present invention will become apparent from a careful reading of the detailed description provided hereinbelow, with appropriate reference to the accompanying drawings.

DETAILED DESCRIPTION OF THE PREFERRED EMBODIMENTS

Figure 5:
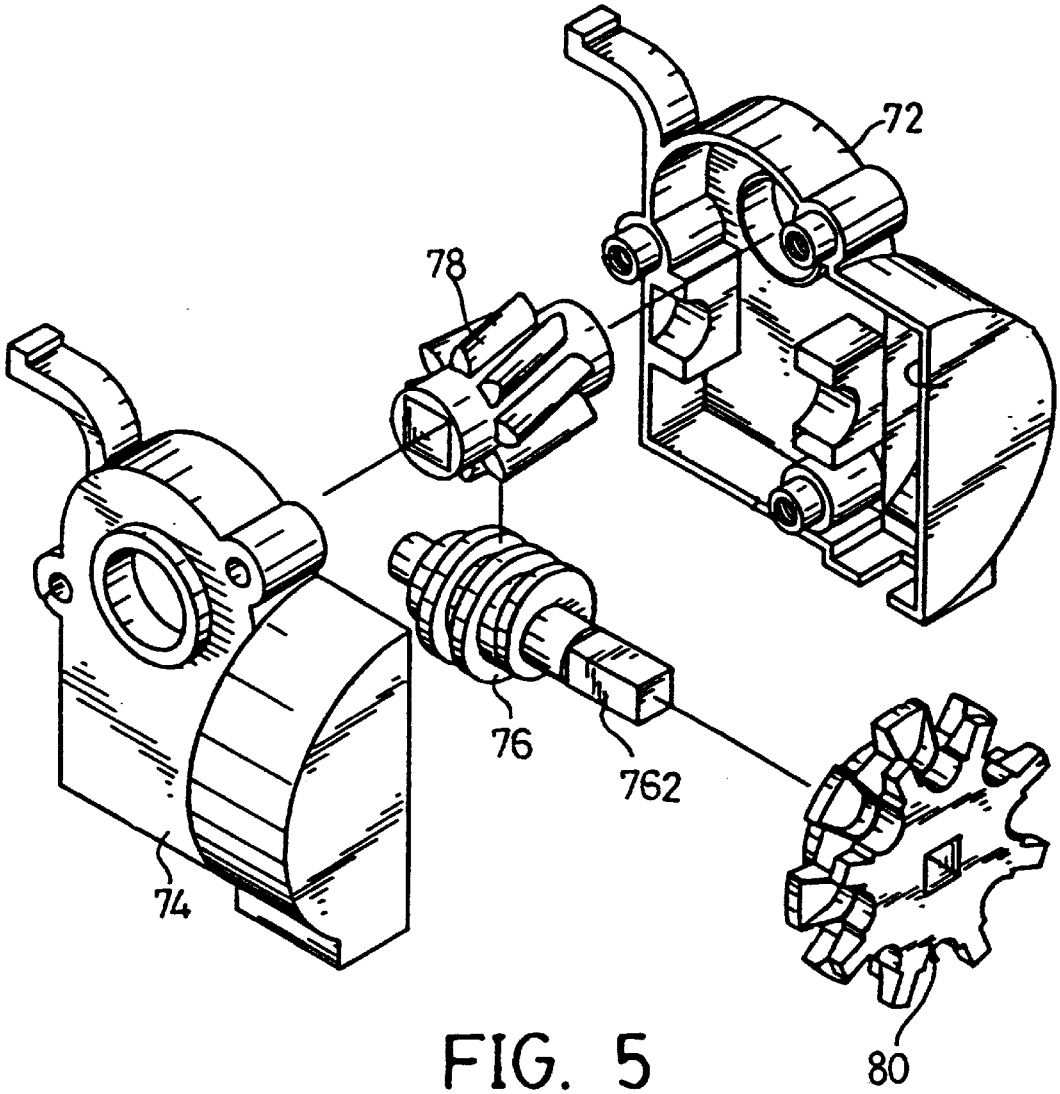
FIG. 5 PRIOR ART
FIG. 5 is an exploded view of a conventional slat angle adjusting device for a Venetian blind in accordance with the prior art.

For a better understanding of the present invention, reference is made to FIG. 5 illustrating a conventional slat angle adjusting device for a Venetian blind (not shown) in accordance with the prior art.

The conventional slat angle adjusting device comprises a first casing 72 and a second casing 74 coupled together with each other and received in a substantially U-shaped headrail (not shown) of the Venetian blind.

A tilt rod (not shown) is longitudinally disposed in the headrail and extends through the first and second casings 72 and 74. A pinion 78 is rotatably received between the first and second casings 72 and 74 and is fixedly mounted around the tilt rod.

A worm 76 located beneath the pinion 78 is rotatably mounted between the first and second casings 72 and 74 and meshes with the pinion 78. A drive shaft 762 square in cross-section is formed on one end portion of the worm 76. A pulley 80 is rotatably received between the first and second casings 72 and 74 and is fixedly mounted around the drive shaft 762. A tilt cord (not shown) winds around the pulley 80 and has two distal ends extending downwardly.

In operation, a user can exert a drawing force on the two distal ends of the tilt cord, thereby rotating the pulley 80 which can drive the drive shaft 762 to rotate the worm 76 which can in turn rotate the pinion 78 so as to rotate the tilt rod, thereby adjusting a rotational angle of a plurality of slats (not shown) of the Venetian blind.

By such an arrangement, the worm 76 together with the drive shaft 762 is driven by means of the drawing force of the tilt cord so as to rotate the tilt rod via the pinion 78, thereby rotating the plurality of slats.

However, the user has to exert a large force on the tilt cord so as to rotate the plurality of slats via a transmission of the worm 76 and the pinion 78 when the plurality of slats are made of a heavy material such as wood and the like, thereby greatly causing an inconvenience in operation.

Figure 1:
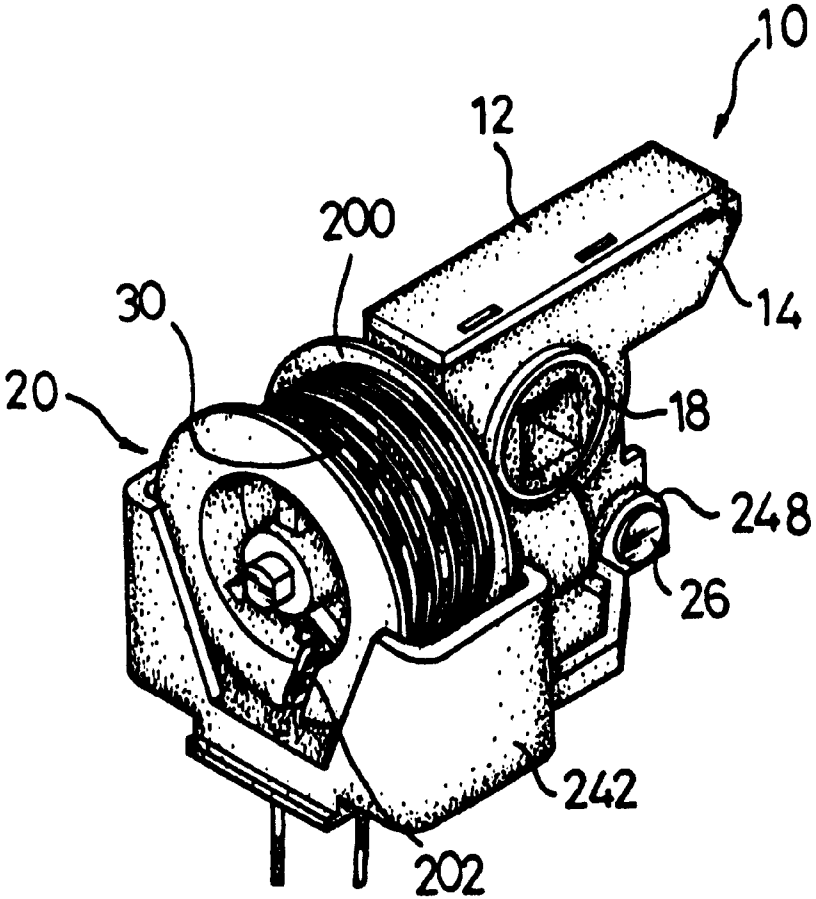
FIG. 1 is a perspective view of a slat angle adjusting device for a Venetian blind in accordance with the present invention.
Figure 2:
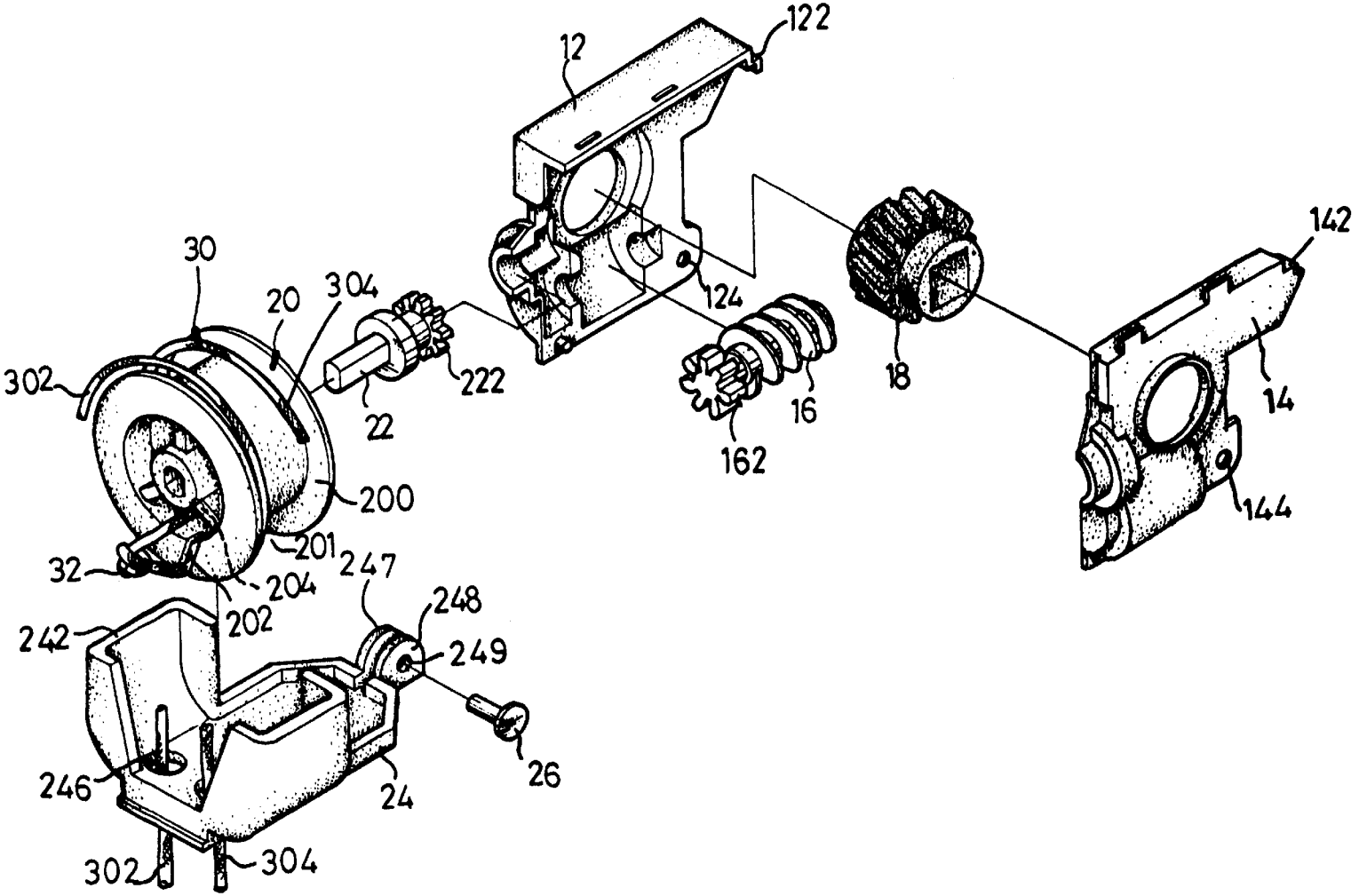
FIG. 2 is an exploded view of FIG. 1.
Figure 3:
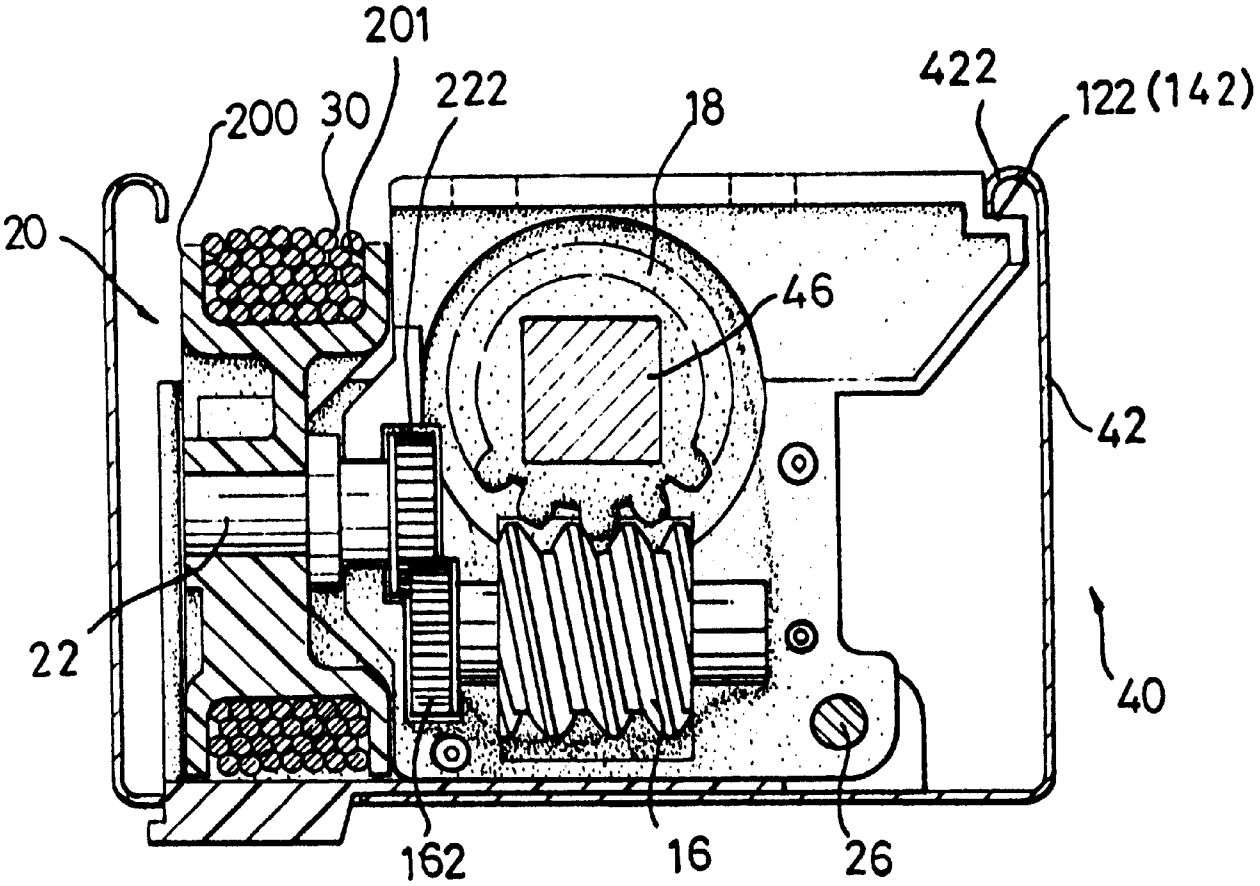
FIG. 3 is a front plan cross-sectional view of FIG. 1, showing the adjusting device being received in a headrail of the Venetian blind.

Referring to the remaining drawings, and initially to FIGS. 1–3, a slat angle adjusting device 10 in accordance with the present invention is provided for adjusting a rotational angle of a plurality of slats (not shown) of a Venetian blind 40. The Venetian blind 40 comprises a headrail 42 substantially U-shaped in section with two side walls each having a hook portion 422 extending inwardly and downwardly therefrom.

The slat angle adjusting device 10 comprises a first casing 12 and a second casing 14 received in the headrail 42 and coupled with each other. The first and second casings 12 and 14 respectively have an abutting edge 122 and 142 on each of which an associated hook portion 422 of the headrail 42 is securely rested respectively.

A pinion 18 is rotatably mounted between the first and second casings 12 and 14. A tilt rod 46 is fixedly mounted in and driven by the pinion 18 for adjusting a rotational angle of the plurality of slats of the Venetian blind 40.

A worm 16 located beneath the pinion 18 is rotatably mounted between the first and second casings 12 and 14 and meshes with the pinion 18, and a driven gear 162 is fixedly mounted on one end of the worm 16.

A drive gear 222 located above the driven gear 162 is rotatably mounted between the first and second casings 12 and 14 and meshes with the driven gear 162. A drive axle 22 with a square cross-section is integrally formed on one end of the drive gear 222 and extends outward of the first and second casings 12 and 14.

A supporting bracket 24 is received in the headrail 42 and has a first end portion mounted on an underside of the first and second casings 12 and 14, and a second end portion having two side walls 242 extending upwardly therefrom. Two spaced holes 246 are vertically defined in the second end portion thereof and are located between the two side walls 242.

A first ear 247 and a second ear 248 are formed on the first end portion of the supporting bracket 24 and are each mounted on an outer wall of the first and second casings 12 and 14 respectively.

A pin 26 extends sequentially through a second hole 249 defined in the second ear 248, a second bore 144 defined in the second casing 14, a first bore 124 defined in the first casing 12 and a first hole (not numbered nor shown) defined in the first ear 247. A small distal tip of the pin 26 is deformed to prevent its loss. The supporting bracket 24 is thereby attached to the combined first and second casings 12 and 14.

A roller 20 is fixedly mounted to the drive axle 22 and is rotatably received between the two side walls 242 of the supporting bracket 24.

Figure 4:
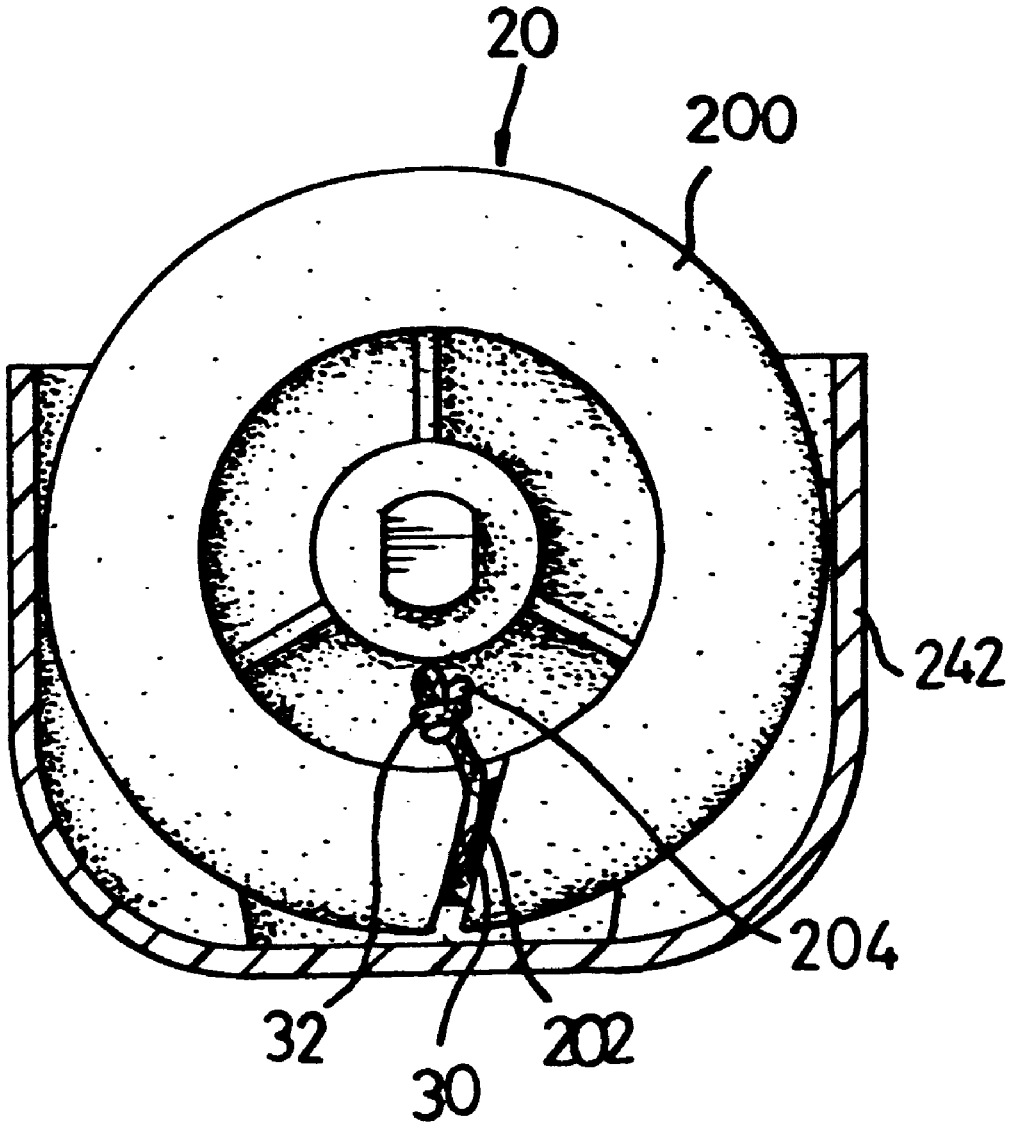
FIG. 4 is a partially cross-sectional side view of FIG. 1.

Referring to FIGS. 2 and 4, the roller 20 includes two sides each having a flange 200 extending radially and outwardly therefrom. A recess 201 is defined between the two flanges 200. Each of the two flanges 200 has a slit 202 defined therein and communicating with the recess 201. A through hole 204 is longitudinally defined in the roller 20.

A tilt cord 30 extends through the through hole 204 and has a first end 302 extending through one slit 202, it then winds around the roller 20 and extends downwardly through one hole 246 of the supporting bracket 24, and has a second end 304 extending through the other slit 202, it then winds around the roller 20 along a direction opposite to that of the first end 302 and extends downwardly through the other hole 246 of the supporting bracket 24.

Preferably, a knot 32 is formed at a meditate portion of the tilt cord 30 and is stopped by a side wall defining the through hole 204 of the roller 20.

In operation, referring to FIGS. 2 and 3, a user can exert a pulling force on the first end 302 (or the second end 304) of the tilt cord 30, thereby rotating the roller 20 which can force the drive axle 22 to rotate the drive gear 222 which in turn rotates the driven gear 162 together with the worm 16 which is able to rotate the pinion 18 so as to rotate the tilt rod 46, thereby easily adjusting a rotational angle of the plurality of slats of the Venetian blind 40.

By such an arrangement, the tilt cord 30 can be used to rotate the plurality of slats of the Venetian blind 40 by means of the drive gear 222 co-operating with the driven gear 162 and the worm 16 co-operating with the pinion 18 without having to exert a large pulling force on the tilt cord 30 even when the plurality of slats are made of heavy material such as wood and the like, thereby greatly facilitating operation of the tilt cord 30.

It should be clear to those skilled in the art that further embodiments of the present invention may be made without departing from the scope and spirit of the present invention.

What is claimed is:

1. A slat angle adjusting device (10) for a Venetian blind (40) comprising:

a first casing (12);

a second casing (14) coupled with said first casing (12);

a pinion (18) rotatably mounted between said first and second casings [(12) and (14)];

a worm (16) rotatably mounted between said first and second casings [(12) and (14)] and meshing with said pinion (18), a driven gear (162) fixedly mounted on one end of said worm (16);

a drive gear (222) rotatably mounted between said first and second casings [(12) and (14)] and meshing with said driven gear (162), a drive axle (22) formed on one end of said drive gear (222) and extending outward of said first and second casings [(12) and (14)];

a bracket (24) having a first end portion engaged with said first and second casings [(12) and (14)], and a second end portion [having two side walls (242) extending upwardly therefrom]; and a roller (20) fixedly mounted around said drive axle (22) and rotatably received [between said two side walls (242) of] *by* said bracket (24).

2. The slat angle adjusting device in accordance with claim 1, wherein said roller (20) has two sides each having a flange (200) extending radially and outwardly therefrom, a recess (201) defined in said roller (20) and located between said two flanges (200), each of said two flanges (200) having a slit (202) defined therein and communicating with said recess (201).

3. The slat angle adjusting device in accordance with claim 1, wherein said roller (20) has a through hole (204) longitudinally defined therein.

4. The slat angle adjusting device in accordance with claim 1, wherein said bracket (24) has two spaced holes (246) vertically defined in the second end portion thereof and located under said roller (20).

*5. The slat angle adjusting device in accordance with claim 1, wherein said bracket (24) has two side walls (242) extending upwardly from the second end portion thereof, and said roller (20) is rotatably received between said two side walls (242) of said bracket (24).*

* * * * *